United States Patent [19]
Falchi et al.

[11] Patent Number: 5,728,783
[45] Date of Patent: Mar. 17, 1998

[54] PROCESS FOR PREPARING ETHYLENE-BASED POLYMERS HAVING LOW MOLECULAR WEIGHT

[75] Inventors: Paolo Falchi, Chieti, Italy; Trevor John Russell, Bletchley, Great Britain

[73] Assignee: Societa 'Italiana Additivi Per Carburanti S.r.l., Pescara, Italy

[21] Appl. No.: 741,262

[22] Filed: Oct. 30, 1996

[30] Foreign Application Priority Data

Oct. 31, 1995 [IT] Italy ................... MI95A2262

[51] Int. Cl.$^6$ ................... C08F 6/24; C08F 6/02; C08F 2/06
[52] U.S. Cl. ............... 526/124.2; 526/905; 528/499; 528/500; 528/501; 528/503; 585/512; 585/833
[58] Field of Search ................ 526/124.2, 124.1, 526/905; 528/501, 499, 500, 503; 585/512, 833

[56] References Cited

U.S. PATENT DOCUMENTS

| | | |
|---|---|---|
| 3,608,611 | 9/1971 | Oshima et al. . |
| 4,906,329 | 3/1990 | Tominari et al. ............ 528/501 X |
| 5,229,477 | 7/1993 | Job et al. ............ 526/336 X |
| 5,326,855 | 7/1994 | Kahn ............ 528/501 X |
| 5,374,695 | 12/1994 | Tanaglia et al. ............ 526/336 X |

FOREIGN PATENT DOCUMENTS

| | | |
|---|---|---|
| 0 059 106 | 9/1982 | European Pat. Off. . |
| 0 060 609 | 9/1982 | European Pat. Off. . |
| 0 223 394 | 5/1987 | European Pat. Off. . |
| 1 304 070 | 1/1973 | United Kingdom . |
| 90/01503 | 2/1990 | WIPO . |
| 93/13843 | 7/1993 | WIPO . |

OTHER PUBLICATIONS

Partial European Search Report, EP 96 11 7333, Jun. 26, 1997.

*Primary Examiner*—Fred Teskin
*Attorney, Agent, or Firm*—Watson Cole Stevens Davis, P.L.L.C.

[57] ABSTRACT

Polymerization process to obtain elastomeric copolymers or terpolymers based on ethylene for cold flow improver (CFI) having a viscosimetric average molecular weight ranging between 600 and 16,000.

a) The process includes polymerizing monomers in suspension in the presence of an alpha-olefin liquid under reaction conditions, in the presence of an amount of solvent from about 5 to 30% by volume of the reactor volume in the presence of a polymerization catalyst able to give the $X_2$ and/or $X_4$ parameters, lower less than or equal to 0.02, $X_2$ and $X_4$ representing the fraction of uninterrupted methylenic sequences of 2 and 4 methylenic groups between two successive methyl or methylene groups respectively in the polymeric chain, as compared with the uninterrupted total sequences of methylene groups determined by $^{13}$C-NMR;

b) Conveying the reaction slurry into a flash pipe for the evaporation of the unreacted monomers and of minimum quantities of solvent;

c) The polymeric part with the quantity of solvent of the same type or different as above, so as to obtain the desired polymer concentrations, and deactivation of the catalyst by bubbling of wet air stream.

11 Claims, No Drawings

PROCESS FOR PREPARING ETHYLENE-BASED POLYMERS HAVING LOW MOLECULAR WEIGHT

BACKGROUND OF THE INVENTION

1. Field of the Invention

The present invention relates to a process for the preparation of additives to be used as cold flow improvers (CFI) for liquid hydrocarbons derived from oil distillation, in particular middle distillates such as gas oil.

Particularly, the invention relates to a process for the preparation of ethylene and alpha-olefin copolymers, in particular propylene, or terpolymers obtained by adding a third dienic monomer, or compositions comprising said polymers.

More particularly, the process relates to polymers having the structural characteristics described in EP 350072.

The copolymers (terpolymers) described in said patent have a value of $X_2$ and/or $X_4$ parameters equal to or less than 0.02; $X_2$ and $X_4$ represent the fraction of methylenic sequences containing uninterrupted sequences of 2 and 4 methylenic groups between two successive methyl or methylene groups respectively in the polymeric chain, as compared with the uninterrupted total sequences of methylene groups determined by $^{13}$C-NMR.

This specific copolymer and/or terpolymer shows improved properties as CFI with respect to other polymeric chains having the same base without the essential feature of $X_2$, $X_4$ cited above.

2. Discussion of the Prior Art

Patent application EP350072 exemplifies and describes polymers having a high average molecular weight, calculated by the viscosimetric method, with values varying from about 80,000 to about 120,000 as additives suitable as cold flow improvers (CFI).

The same patent application also discloses, as suitable products, lower molecular weight products obtained from high molecular weight polymers after a degradation process.

There are exemplified degraded polymers with viscosimetric average molecular weights ranging from about 20,000 to about 50,000.

In general it is stated in the specification that the suitable viscosimetric average molecular weights range between 1,000 and 200,000, preferably between 3,000 and 150,000.

In said patent application the polymers are obtained by using high yield catalysts, in particular titanium salts supported on magnesium chloride, and other possible catalysts provided that they can provide the essential features of $X_2$ and $X_4$ of the copolymer or terpolymer stated above.

An object of the present invention is a process for the preparation of polymers suitable as cold flow improver (CFI) having the properties recited in the above cited patent application which allows for low molecular weight polymers, as defined below and avoids the degradation process.

According to the cited patent application, this degradation process step is stated as a preferred one to obtain polymers therein described with molecular weights lower than 100,000.

In practice this process step is essential since the high molecular weight polymers induce into the system also viscostaticity characteristics.

Indeed in the cited prior art degradation step was unavoidable, otherwise the high molecular weight copolymer was not sufficiently soluble in the normal hydrocarbon solvent such as, for example, toluene, cyclohexane and other hydrocarbon blendings specific in the gas oils distillation.

The practical result is that only low concentration additives can be prepared with evident industrial disadvantages, for example, one ends up with higher transportation costs since substantially what is transported is the solvent and not the additive useful as CFI.

The additive concentration reaches maximum values at around 10% by weight for molecular weights of about 100,000 if one wants to obtain processable solutions at room temperature.

The industrial disadvantage is the need of a very expensive plant which involves the addition of units where one carries out degradation to obtain solutions containing the additive at higher concentrations.

In the cited patent application, no alternative is there are not stated other processes for obtaining low molecular weight polymers for the following reasons.

It is well known in the art to prepare of elastomeric copolymers of ethylene with propylene or other higher alpha-olefins.

There are also known elastomeric terpolymers obtainable with the components indicated for the copolymers and the addition of a third monomer containing two double bonds (diene).

The known processes are substantially divided in two classes: solution processes (solvent) and suspension processes (bulk).

The solution processes take place in the presence of solvents, such as, for example, hexane, cyclohexane, toluol, etc. which bring about the production of elastomeric copolymers and terpolymers dissolved in the solvent.

The polymeric solution coming from the reactor shows a polymer content of about 5–10% by weight depending on the weight average molecular weight.

The obtained polymers have a high molecular weight, generally greater than 80,000 as weight average molecular weight.

It must be understood that depending on the weight average molecular weight the concentration of the polymer in the solvent has a limit value, since over this limited the stirring of the reaction mass becomes difficult and the heat transfer and the monomer solubility does not decrease proportionally.

The polymerization process in solution can take place in a single reactor or in a series of reactors and the global process consists of more stages: the described polymerization, subsequent step of purification from catalytic residues followed by a stripping with steam to separate the unreacted monomers.

The catalytic residues must be removed by treating the polymeric solution at the reactor exit, for example, by an aqueous solution of caustic soda.

This stage of the process is simply an extraction, and it more effective depending on the elapsed time and the number of washings.

The further stripping step consists of putting the washed solution in contact with heated water and steam so as to evaporate the monomers and the solvent.

Thus one obtains gummy granular suspensions of elastomeric copolymer or terpolymer in water.

The disadvantage of the solution process resides in that it is difficult to prepare low molecular weight polymers since these are difficult to separate from the solution coming from the stripper.

Experiments carried out by the applicant showed that polymers with weight average molecular weights lower than 80,000 give many drawbacks both in catalysts remaining and in the stripping steps.

In fact the solution should be made up of low molecular weight polymers and therefore would have a very low viscosity by causing emulsion phenomena in the stripping step and separation phenomena with the formation of two phases in which the polymeric part, having lower density, is in the upper part of the stripper leading to considerable processability problems and removal of unreacted monomers.

Therefore, the process in solution, even if it theoretically could be used for low molecular weight polymer synthesis, is not advantageous both from an industrial and economic point of view, and technically is not feasible.

Moreover it must be noted that the conversion of the monomers into polymers is very small with a subsequent low specific production rate for the reactors. At most a value of 10% total solid can be obtained with a sole reactor. Thus, the process leads to little industrial interest and presents storage and transportation problems.

The alternative stated in the cited EP patent application is to use a degradation process when low molecular weight polymers are desired.

A suspension process is known in which the polymerization takes place, for example, in liquid propylene in which the obtained polymer is insoluble.

In the alternative one can use mixtures of liquid propylene with propane and butane acting as suspending agents for the reaction polymeric products.

From a technical point of view, this process shows the following limits and drawbacks: the polymerization temperature cannot exceed 80°–90° C., this being the propylene critical temperature (92° C.). By increasing the polymerization temperature the polymers enter into solution with consequent lowering of the ethylene solubility and the fouling of reactor walls caused by the high molecular weight polymers.

This drawback discussed immediately above makes stirring of the system difficult.

In this process due to the high polymerization rate, the catalysts can be left in the polymer, i.e., it is not necessary to the process to remove the catalytic residues.

Nevertheless the aqueous stripping for the monomer recovery shows the same drawbacks stated for the process in solution.

Therefore, also with this process, as already said for the process in solution, it is not possible to obtain low molecular weight polymers.

Due to the indicated drawbacks it is evident, from what is taught in the above cited patent application that [where the] degradation is the only stated process step for obtaining low molecular weight polymers, i.e., less than 100,000 average molecular weight.

Therefore there are no alternatives to the described industrial processes when a low molecular weight product is desired.

SUMMARY OF THE INVENTION

Therefore, the object of the present invention is a polymerization process of elastomeric copolymers or terpolymers based on ethylene for cold flow improver (CFI) having a viscosimetric average molecular weight ranging between about 600 and about 16,000, preferably between 4,000 and 14,000, more preferably 6,000–12,000, comprising:

a) to carry out the polymerization of monomers in suspension in the presence of alpha-olefin having 3–12 carbon atoms, under liquid reaction conditions, in the presence of an amount of solvent from about 5 to 30% by volume, preferably 10–20% of the reactor volume, with solubility parameter comparable to the liquid product, in the presence of a polymerization catalyst able to give the $X_2$ and $X_4$ parameters, as defined above;

b) conveying the polymer slurry into a flash pipe for the evaporation of the unreacted monomers and of minimum quantities of solvent, for example, lower than 10%;

c) separation of the polymeric solution with the quantity of solvent introduced into the reactor as solvent foot, in solvent of the same type or different, so as to obtain the desired polymer concentrations, and deactivation of the catalyst by bubbling a wet air stream.

DETAILED DESCRIPTION OF THE INVENTION

The applicant has unexpectedly and surprisingly found that by carrying out the flash with the polymer slurry of the present invention, the monomers dissolved in the solution are almost totally removed. In general, the remaining quantity of monomer is <3 % by weight.

The applicant has unexpectedly found that, in the subsequent step of the catalyst deactivation by bubbling wet air stream (step c), the quantity of monomers dissolved in the polymeric solution was lower than 0.01% by weight.

In this case, no further stripping steps are necessary with water or steam which should cause the above mentioned drawbacks.

Tests carried out by the applicant showed that by carrying out the flash on high molecular weight polymers, about 80,000 as a weight average molecular weight, it is not possible to remove the monomers in large quantities and it is always necessary to add a stripping step with the above mentioned drawbacks.

The quantity of remaining monomers before stripping in these cases is greater than 5% by weight; in general, it ranges between 7–10% by weight.

The flash and separation steps permit one to obtain a polymer solution, optionally by adding solvent in this step.

Solubility parameter in relation to the produced copolymer, is meant one reported by Flory in chapter XII of "Principle of Polymer Chemistry" edited by Cornell University Press, Ithaca, N.Y. (1953) and confirmed by Collins in "Experiments in Polymer Science", edited by Wiley Interscience, N.Y. (1973).

In the polymerization step, the molecular weight is regulated at the desired value either by the temperature and/or by the addition of a molecular weight regulator.

The polymers can also contain also units deriving from monomers having 6 to 20 carbon atoms, as for example, styrene, alpha-methylstyrene; or deriving from polar monomers such as alkyl-methacrylates where the alkyl has 1–20 carbon atoms, preferably 1–6, for example, methylmethacrylate.

The polymerization process temperature of this invention can range from −50° C. to +200° C. One can work at atmospheric pressure or under pressure, for example, up to 100 atm.

In the mixed process solution/suspension of the present invention, the polymer is completely dissolved in the reaction solvent or highly swelled in the suspending monomer.

One can polymerize in propylene when ethylene/propylene copolymers are prepared, or in the presence of the alpha-olefin when no propylene is used.

In general, the alpha-olefin has from 3 to 20 carbon atoms, preferably from 3 to 6. For example, one can see butene, 4-methylpentene-1, and hexene-1.

As solvents, for example, one can use aliphatic hydrocarbon solvents containing from 5 to 20 carbon atoms, alicyclic from 6 to 20 carbon atoms, aromatic from 6 to 20 carbon atoms, aromatic-substituted from 6 to 20 carbon atoms, for example, alkylbenzenes, or aromatic containing heteroatoms in the aromating ring. One can also use the well known hydrochlorofluorocarbon and hydrofluorocarbon solvents.

The sole requisite of the solvent is that it be polymerization grade for the catalytic system used.

The copolymers and terpolymers of the present invention can be saturated or unsaturated. The latter are obtained when conjugated diolefinic monomers are used, for example, from 4–10 carbon atoms, or non-conjugated from 6 to 20 carbon atoms, for example, 1–4-hexadiene, ethyldennorbornene, cyclooctatriene, norbornene, and methyltetrahydroindene.

Both heterogeneous and homogeneous catalysts can be used, the former ones being derived from, for example, Ti, Zr and Hf salts, also supported, for example, on magnesium chloride, and the latter ones derived from metallocenes of the same metals.

The catalysts suitable for the process of the invention are in general ones used for the polymerization of alpha-olefins, diolefins, acethylenic compounds, polyenes and carbon monoxide.

The following list is not exhaustive but simply illustrative of the variety of the usable catalysts.

For the ethylene-propylene-1,4-hexadiene synthesis, one can see, for example, the Italian patent application No. 22204 A/81; likewise for the ethylene propylene-1,3-butadiene synthesis.

Other patents on catalysts are, for example, the Italian patent applications No. 20386 A/85 and No. 19473 A/84. Moreover, we can also cite U.S. Pat. No. 3,658,770 and No. 3,651,032.

As regards catalysts for the synthesis of polymers from cyclic olefins and bifunctional cyclic olefins, one can see U.S. Pat. No. 4,567,244, No. 4,607,112, No. 4,645,814.

As regards catalysts for the synthesis of polymers starting from vinyl-aromatic monomers (for example, styrene), one can cite patent applications WO 88-10275, EP 361,309, 389,939, 417,724, 421,659 and the U.S. Pat. No. 4,774,301 and No. 4,808,680.

As regards olefins, diolefins, acetylenes, polyenes and carbon monoxide, one can mention patents EP 416,815, 418,044, 468,651, 277,003, 277,004, 468,537 and WO 92-00333.

As regards dienic monomers, unsaturated nitriles, unsaturated aliphatics or halogenated aromatics, one can see patent EP 476,671 for the acrylic monomers (methylmethacrylate) and U.S. Pat. No. 4,728,706.

For 1,3-butadiene, 1,5-hexadiene and 1,4-hexadiene, one can see the following patent applications WO 88-04672, 88-04673, 88-04675 and 90-01337.

A further object of the present invention is represented by the fact that the described process permits one to also prepare copolymers derived from homogeneous catalysts, for example, catalysts based on vanadium salts, preferably $VOCl_3$, vanadium acetylacetonate, vanadium alcoholate, which permit one to obtain highly random polymers.

These products can be used as viscosity index improvers, since, in general, they have a molecular weight between 50,000 and 125,000 viscosimetric molecular weight. In this case the $X_2$ and $X_4$ characteristics are not present since these products are not usable as CFI.

In this case, a stripping step is necessary to remove the residual monomer after the flash step.

By the process of the present invention one can obtain, if desired, products for CFI also with molecular weights >16,000, preferably of 20,000, but also up to about 80,000, preferably <70,000.

Also in this case for high molecular weights after the flash step, the stripping step is necessary.

These copolymers can be mixed in low percentages with the products of the invention having lower molecular weights to obtain physical mixtures suitable to treat particular gas oils.

The products having low molecular weight, preferably comprised from 600 to 6,000, can be used as synthetic lubricant oils. Another application of the polymers having molecular weight, generally between 600 to about 40,000–50,000, is the use as additives for plastic materials and rubbers. Preferably the polymers in solution are used as additives, the obtainment of which has already been described for the CFI.

In the process of the present invention, the catalyst components can be fed into the reactor containing the monomers, in the dry state (that is, in the absence of solvents or liquid suspending agents) or in the dispersed state in a paraffinic hydrocarbon.

Such paraffinic hydrocarbons can be solid or liquid at room temperature, so the catalyst can be fed as a suspension in liquid paraffinic oil or as dispersion in paraffin wax.

The suspension can be carried out also in high-boiling hydrocarbons both aliphatic, aromatic and naphtenic.

A device and a process to carry out such a feeding in the powder state of the catalyst component in the solid state which can be used in the process of the present invention and it is described in Italian patent application No. 25522 A/77.

In practice, one works by conveying separately to the reactor the described catalyst solid component and the co-catalyst, for example, alkylaluminium or its reaction products with water, pure or dispersed in paraffinic oil or dissolved in aliphatic or aromatic hydrocarbons.

The molar ratio between aluminium and the transition metal is comprised between 1 and 10,000, preferably between 50 and 500.

By separate feeding, a molecular weight regulator can be conveyed to the reactor, for example, hydrogen or diethyl zinc; optionally, it can also be dispersed in paraffinic oil.

The amount of aliphatic, aromatic or naphtenic solvent added, of polymerization grade, permits are to reduce the polymeric solution viscosity. If the polymerization is carried out at temperatures greater than those critical of the most low-boiling reactive monomers, then the solvent must have a boiling temperature greater than the said critical temperature. For example, in the case of propylene, the solvent must have a temperature greater than the critical temperature.

During the polymerization reaction, the reaction is continuously fed ethylene and propylene, or butene-1 or the desired alpha-olefins or their mixtures, to maintain a constant composition in the reactor. This is accomplished through a chromatographic control of the gas phase of the reactor itself, the polymer viscosity in the reactor is measured through a viscosimeter, for example, applied in parallel, which gives the desired molecular weight of the polymer.

This last part is used to establish a priori the molecular weight of the polymer which is produced in the reaction.

The polymeric solution-suspension coming from the reactor which can reach also, for example, a content of 60% by weight of the polymer product depending on its molecular weight and on the reaction temperature, is fed continually, keeping constant the reactor level, into a pipe where the flash occurs or the almost instant evaporation of the nonconverted monomers.

In such section occurs the further concentration of the polymer into the high-boiling solvent used to assure a predetermined viscosity of the medium.

The flash pipe can be of the type described in the U.S. Pat. Nos. 3,428,619 and 4,126,743.

The pressure inside the pipe is practically atmospheric, in any case it is lower than that of the polymer solution-suspension in the reactor. Also a vacuum can be used to obtain a pressure lower than atmospheric.

Such a pipe, for the purposes of the present invention, is provided with an external jacket in which a fluid flows, for example, water/steam, oil, at a temperature comprised between 30° C. and 200° C., preferably between 50° C. and 150° C.

It can be linear or have a different form, have constant or increasing cylindric section.

The terminal section of the flash pipe can also be elbow-shaped, if desired.

Preferably, but not necessarily, together with the polymer solution-suspension, there is introduced into the flash pipe a stream of warm fluid at a temperature, between 30° C. and 100° C., for example, gas propylene, propane.

The speed inside the pipe is preferably greater than 15 m/sec, preferably between 25 m/sec and 50 m/sec depending on the boiling temperature of the solvent used, on the viscosity of the polymeric solution and on the pressure difference between the reactor and the flash unit.

The solution-dispersion temperature at the end of the pipe is in the range of −10° C. and +80° C.

At the exit of the flash pipe, the polymeric solution-suspension is viscous and contains a very small quantity of monomers, generally lower than 3% by weight.

For this reason no stripping step is requested.

After this flash step, the polymeric solution is conveyed to a degasing unit at high temperature where, under vacuum and with an inert, for example, wet nitrogen or wet air, removal of the last traces of unreacted monomers and the extinction of the catalytic residues.

The propylene recovered at the head of the flash pipe can be compressed and if necessary condensed and directly recycled into the reactor.

It is possible to use chemical grade propylene such as that produced by cracking with a propane content of 5–6%. In the described process it is possible to reach a propane content of 40–50% by weight in the reacting mixture and a solvent content of 53% by weight without decreasing either of the catalytic activity or of the yield.

The volume of solvent and liquid monomer is about 50–60% of the total volume of the reactor.

The so obtained polymeric solution can be further diluted with solvent to obtain the desired additives well known in the art can be added.

The process is particularly suitable to the preparation of ethylene-propylene copolymers containing from 10 to 90% by weight of propylene and preferably from 25 to 65%.

When a diene is present, the quantities are lower, generally of about 10% by weight.

The advantages of the process of the present invention can be summarized as follows: one can use all the known catalytic systems for the polyolefin synthesis provided they generate the requisite $X_2$ and $X_4$ parameters, when the products are to be used as cold flow improvers; in the polymerization no fouling of the reactor occurs; the obtained polymer can also reach concentrations >40% by weight in the final solvent and the concentration can be adjusted, optionally by adding solvent.

The process is particularly inexpensive and flexible, it is allowing one to obtain saturated and unsaturated copolymers or terpolymers, it is ecologically attractive since it discharges nothing into the atmosphere other than the process drains eliminating in bar.

As already mentioned, the stripping step, with steam, is eliminated, which step is essential for solution or suspension processes having the purpose to remove the unreacted monomers from the polymer.

As already said, this step would be very expensive for producing low molecular weight polymers, of low reliability due to packing and/or demixing between the aqueous and the organic phases and very much a pollutant generating factor in view of the large quantity of water to be recycled.

The process of the present invention allows one to avoid the expensive chemical operations of the catalytic residues and the stripping.

The main advantage of the process object of the present invention is the possibility to prepare CFI in highly concentrated solutions but maintaining the high properties as CFI shown by the high molecular weight polymers.

The following experimental examples are reported to better illustrate the present invention but without limiting the same.

EXAMPLE A

The following test has been carried out in a 20 l pilot plant where ethylene, propylene, catalysts and molecular weight regulators were continuously fed. In a 20 l reactor are fed:

| | |
|---|---|
| propylene | 5.9 Kg/h |
| ethylene | 900 g/h |
| catalyst component: | 0.0173 g/h (as catalyst of a |
| 11.1% by weight of Ti supported on MgCl$_2$ | 10% by weight suspension |
| prepared according to example 15 of patent 20386 A/85: | in Vaseline) |
| Al-triisobutyl | 4.16 g/h (as a 10% by weight Al-triisobutyl solution in toluene |
| hydrogen | 50 g/h |
| toluene | 1 Kg/h |

Polymerization temperature and pressure were kept at 50° C. and 58 Atm.

The polymer concentration in the reaction mixture was 20% by weight. The average time into the reactor was 1 hour.

The polymer solution-suspension is continuously discharged into a stainless steel flash pipe with cylindrical section, having a 20 mm diameter and a 6 m length and exchange coefficients between 500 and 2000 Kcal/h.m$^{2°}$ C.

An external jacket of the same material in which water flows at 80° C. keeps the flash pipe at such a constant temperature; the polymeric solution has a speed of 30 m/sec at the entrance of the flash. At the end of the flash the remaining unreacted propylene monomer is about 2.5% by weight, determined by gas chromatography (GC).

The dispersion-solution of the polymer coming from the flash pipe has a speed of 30 m/sec. From the flash pipe it is conveyed to a hopper kept at a temperature of 100° C.

From the bottom of this hopper, 1.7 Kg/h of a polymeric solution at 100° C. was discharged with about 40% by weight of polymer.

The so-obtained polymer contains 34% by weight of propylene with an intrinsic viscosity in tetraline at 135° C. of 0.35. The viscosimetric average molecular weight was 13,000 calculated from the viscosity obtained according to the Moraglio formula cited in example 1.

EXAMPLE 1

The reactor temperature of Example A was maintained at 21° C. and its total pressure was 12.9 Atm.

The ethylene molar percent in the gaseous phase was 32.7%. The fed propylene was 5.4 Kg/h, ethylene was 1 Kg/h, toluene solvent was 1 Kg/h, the catalyst based on titanium salts supported on active magnesium chloride of example A was fed at 0.057 g/h. The molecular weight regulator, in this case zinc diethyl, was 2.5 g/h, as zinc diethyl of a 10% by weight toluene solution.

The molar ratio between aluminium derived from aluminium triisobutyl used as cocatalyst and the titanium of the catalyst was 150. The Al-triisobutyl was 3.29 g/h.

The residence time was about 1 h.

Two Kg/h were obtained of polymeric solution at 50% by weight of polymer having an intrinsic viscosity in tetraline at 135° C. of 0.4, with a viscosimetric molecular weight of 15,600, obtained according to the Moraglio formula published in "Chimica e Industria", Milano, 10, 984, (1959).

The determination of the viscosimetric average molecular weight of ethylene-propylene copolymers:

The theory is applied to ethylene-propylene copolymers in order to determine the K' constant and "a" of $m^a$ in the equation $[\eta]=K' \cdot m^a$ for different compositions. The found constants afford an approximate evaluation, which is satisfactory for technical purposes, for estimates of the viscosimetric molecular weight Mv for such copolymers.

For the determination of the molecular weight of a polydispersed polymer, it is necessary to know the constants of the equation $$[\eta]=K' \cdot m^a$$

which are determined empirically by comparing the molecular weight (determined with an absolute method) and the intrinsic viscosity of a series of polymer fractions having a negligible molecular weight dispersion.

Approximate calculation of the equation $[\eta]=K' \cdot m^a$ for ethylene-propylene copolymers.

A. Data and preliminary formulas.

The values of constants K' and "a" for polyethylene having a linear chain have been determined by using the solvent tetraline at 130° C. (K'=5.10·10$^{-4}$, a=0.725), the constants relevant to propylene in tetraline at 135° C. (K'=1.93·10$^{-4}$, a=0.74).

The calculations of the viscosimetric molecular weight have been made from the % by weight of propylene.

The so-obtained copolymer showed a composition of 40% by weight of propylene; the solution at the end of the flash was 50% by weight of polymer in toluene. After flash the $C_3$ determined by GC in the polymeric solution was 2% by weight. The product was completely soluble in toluene at 25° C., the yield with respect to the catalyst was about 160 Kg of copolymer/g of titanium.

EXAMPLE 2

In a polymerization test analogous to the preceding one, the reactor temperature of example 1 was 20° C. with a total pressure of 12.5 Atm and a propylene feed of 5.8 Kg/h and ethylene 0.85 Kg/h.

The percent by moles of ethylene in the gas phase was 19.4. The same catalyst of example 1 was fed in quantity of 0.07 g/h. As a molecular weight regulator, 2 g/h of zinc diethyl was used.

The catalyst was the same as in example 1.

The average ratio between aluminium triisobutyl and titanium was 150 and Al-triisobutyl was 4.88 g/h. The residence time was about 1 hour.

The used toluene quantity was 0.8 Kg/h.

There were obtained 1.9 Kg/h of polymeric solution at 58% by weight of polymer in toluene.

A polymer was obtained with 55% by weight of propylene with a yield of 140 Kg of copolymer/g of titanium.

The product was completely soluble in toluene at 25° C. and showed an intrinsic viscosity of 0.23 corresponding to a viscosimetric molecular weight of 7400 according to the Moraglio formula above.

After flash the $C_3$ in the polymeric solution was lower than 1%.

EXAMPLE 3

In a test similar to example 1 with a reactor temperature of 12° C. and a total reactor pressure of 12.5 Atm, the same catalyst of example 1 was used.

There were fed 5.8 Kg/h of propylene, 1.28 Kg/h of ethylene, 0.017 g/h of the catalyst of example 1 and 3 g/h of zinc diethyl as molecular weight regulator.

The molar ratio between aluminium, derived from aluminium triisobutyl used as cocatalyst and titanium was 260, the Al triisobutyl was 2.32 g/h. The used quantity of toluene was 0.8 Kg/h and the stay time was about 1 h.

The ethylene percent in the gaseous phase was 46% by moles. 1.3 Kg/h of polymeric solution was obtained at 38% by weight of polymer in toluene.

A copolymer was obtained with a yield of 260 Kg of product/g of titanium and a percent by weight of propylene of 30 with an intrinsic viscosity of 0.5 soluble for 95% by weight in toluene at 25° C.

The viscosimetric average molecular weight was 21,000.

After flash the $C_3$ was 1.5% by weight in the polymeric solution.

EXAMPLE 4

Example 3 was repeated using hydrogen as molecular weight regulator and a third monomer.

The temperature was 40° C. and the total pressure was 18 Atm, the composition in the gas phase was 15% molar of ethylene, 20% molar of hydrogen and 1.2% molar of the third monomer, in this case butadiene. The fed quantities were 0.7 Kg/h of butadiene and 0.7 Kg/h of toluene. The stay time was half an hour.

The reactor was continuously fed with 27 g/h of hydrogen, 9 Kg/h of ethylene, 11.5 Kg/h of propylene, and 5 Kg/h of propane. The catalyst used was the same of example 1 in quantity of 0.03 1 g/h; the molar ratio between aluminium derived from aluminium triisobutyl and titanium was 100, the quantity of Al triisobutyl was 1.4 g/h.

The yield was 120 Kg of copolymer/g of titanium with a content of propylene of 42% by weight.

The third monomer content, butadiene, was 1.7% by weight.

The obtained product was 1.1 Kg/h of polymeric solution at 36% by weight of polymer in toluene. The viscosity was 0.32 with a viscosimetric average molecular weight of 11,500 calculated according to the Moraglio formula.

The product was completely soluble in toluene at 25° C.

EXAMPLE 5

The polymerization was carried out in an autoclave with 5 l volume, containing 1.3 l of n-hexane, using 50 mg of a catalyst consisting of an active magnesium chloride support a titanium tetrachloride thereon with 3% by weight of titanium, obtained according to Italian patent No. 20203 A/81 with lower titanium percent, and 7 millimoles of aluminium triethyl as cocatalyst, corresponding to a molar ratio Al/Ti=200.

Polymerization was operated at 90° C., at a pressure of 15 Atm for 3 hours, in the presence of hydrogen as molecular weight regulator.

The ratio between the hydrogen and ethylene+propylene pressures was 1.5.

In practice the pressure due to hydrogen was 10 atmospheres; of the remaining 5 atmospheres, ⅓ was due to ethylene.

In the gas phase the ratio ethylene:propylene was 1:3.

At the end of the polymerization a solution of copolymer in hexane at 25% by weight with a viscosity of 500 poise at 25° C. was obtained.

The polymer showed an intrinsic viscosity of 0.08 and a viscosimetric average molecular weight of 1780 and a composition of 38% by weight of propylene.

We claim:

1. A polymerization process for obtaining elastomeric copolymers or terpolymers based on ethylene as cold flow improvers (CFI) having a viscosimetric average molecular weight ranging between 600 and 16,000, comprising:

a) polymerizing monomers in suspension in a reaction slurry in the presence of an alpha-olefin having 3 to 12 carbon atoms, liquid in the reaction conditions, in the presence of an amount of solvent from about 5 to 30% by volume of the reactor volume, to dissolve or swell the polymer, in the presence of a polymerization catalyst able to generate $X_2$ and/or $X_4$ parameters, less than or equal to 0.02, $X_2$ and $X_4$ representing the fraction of uninterrupted methylenic sequences of 2 and 4 methylenic groups between two successive methyl and methylene groups respectively in the polymeric chain, as computed with the uninterrupted total sequences of methylene groups determined by $^{13}$C-NMR;

b) conveying the reaction slurry into a flash pipe for the removal of the unreacted monomers and solvent to produce a polymeric solution; and c) recovering a polymeric product from the polymeric solution with solvent, said solvent being the same solvent as recited in step a) or being a second solvent of the same class as the solvent of step a) to obtain the desired polymer concentrations, and deactivating the catalyst by bubbling a wet air stream into the polymeric solution.

2. Process according to claim 1, in which the solvent in phase a) is comprised between 10 and 20% by volume of the reactor.

3. Process according to claim 1 in which in phase a) a third dienic monomer is added.

4. Process according to claim 1 in which the polymerization temperature is comprised between −50° C. and +200° C.

5. Process according to claim 1 in which the polymerization is carried out in the presence of catalysts of Ti supported on $MgCl_2$ in activated form and alkylaluminium is used as cocatalyst.

6. A process for improving cold flow of gas oils by adding thereto the polymers produced according to claim 1.

7. Process according to claim 1 in which the copolymers have a molecular weight ranging from 6,000 and 12,000.

8. Process according to claim 1 in which hydrogen is added as molecular weight regulator.

9. Process according to claim 1 in which the speed of the polymer solution/suspension in the flash pipe is higher than 15 m/sec.

10. Process according to claim 1 in which the obtained polymers contain from 25% to 65% by weight of propylene.

11. A polymerization process for obtaining elastomeric copolymers or terpolymers based on ethylene as a cold flow improvers (CFI) having a viscosimetric average molecular weight ranging between 50,000 and 125,000, comprising:

a) polymerizing monomers in suspension in a reaction slurry in the presence of an alpha-olefin having 3 to 12 carbon atoms, liquid in the reaction conditions, in the presence of an amount of solvent from about 5 to 30% by volume of the reactor volume, to dissolve or swell the polymer, in the presence of a homogeneous polymerization catalyst able to generate $X_2$ and/or $X_4$ parameters, less than or equal to 0.02, $X_2$ and $X_4$ representing the fraction of uninterrupted methylenic sequences of 2 and 4 methylenic groups between two successive methyl and or methylene groups respectively in the polymeric chain, as computed with the uninterrupted total sequences of methylene groups determined by $^{13}$C-NMR;

b) conveying the reaction slurry into a flash pipe for the removal of the unreacted monomers and solvent to produce a polymeric solution;

c) stripping residual monomers from the polymeric solution; and d) recovering a polymeric product from the polymeric solution with solvent, said solvent being the same solvent as recited in step a) or being a second solvent of the same class as the solvent of step a) to obtain the desired polymer concentrations, and deactivating the catalyst by bubbling a wet air stream into the polymeric solution.

* * * * *